Oct. 14, 1924.
E. E. CRONENWETH
1,511,657
TIRE CHAIN APPLIER
Filed May 21, 1923    5 Sheets-Sheet 5
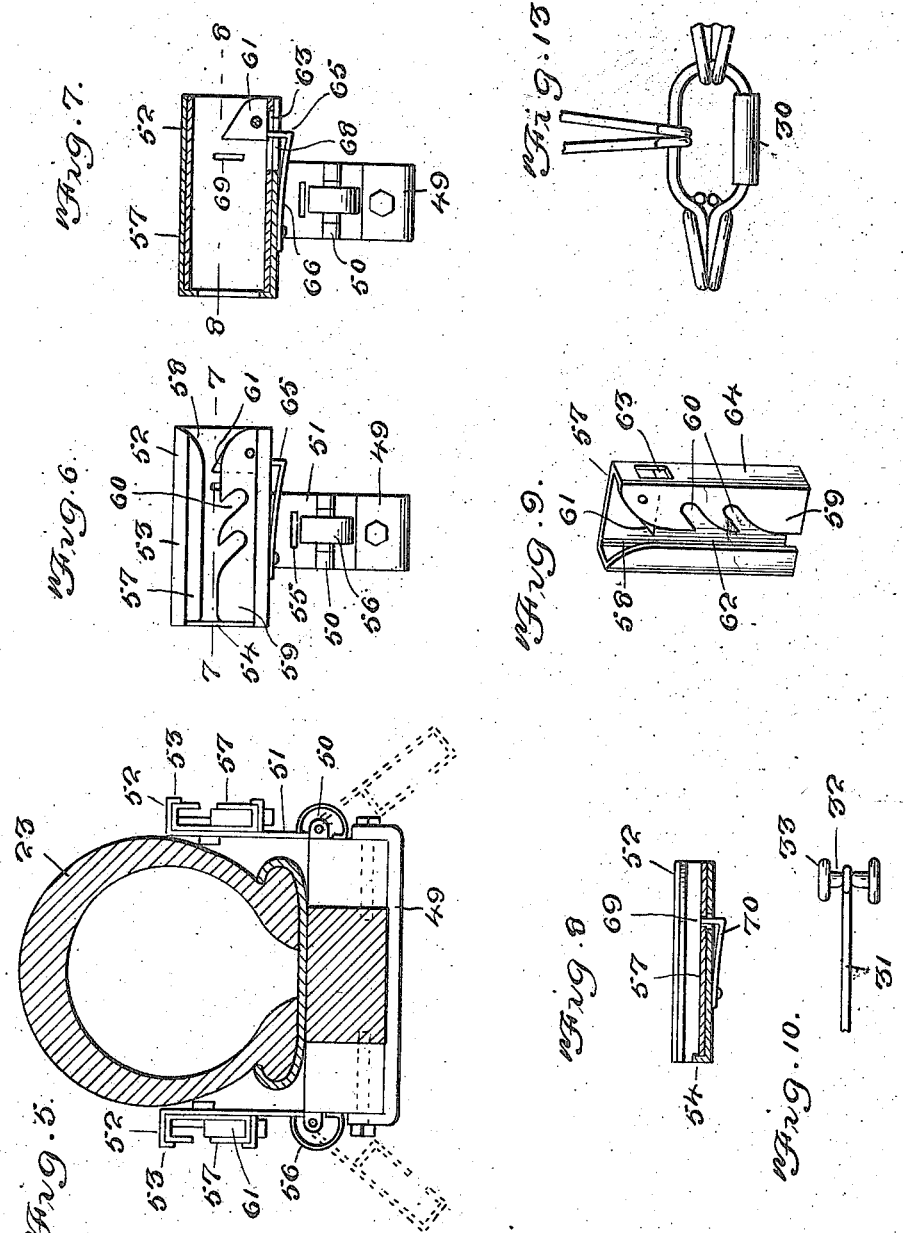

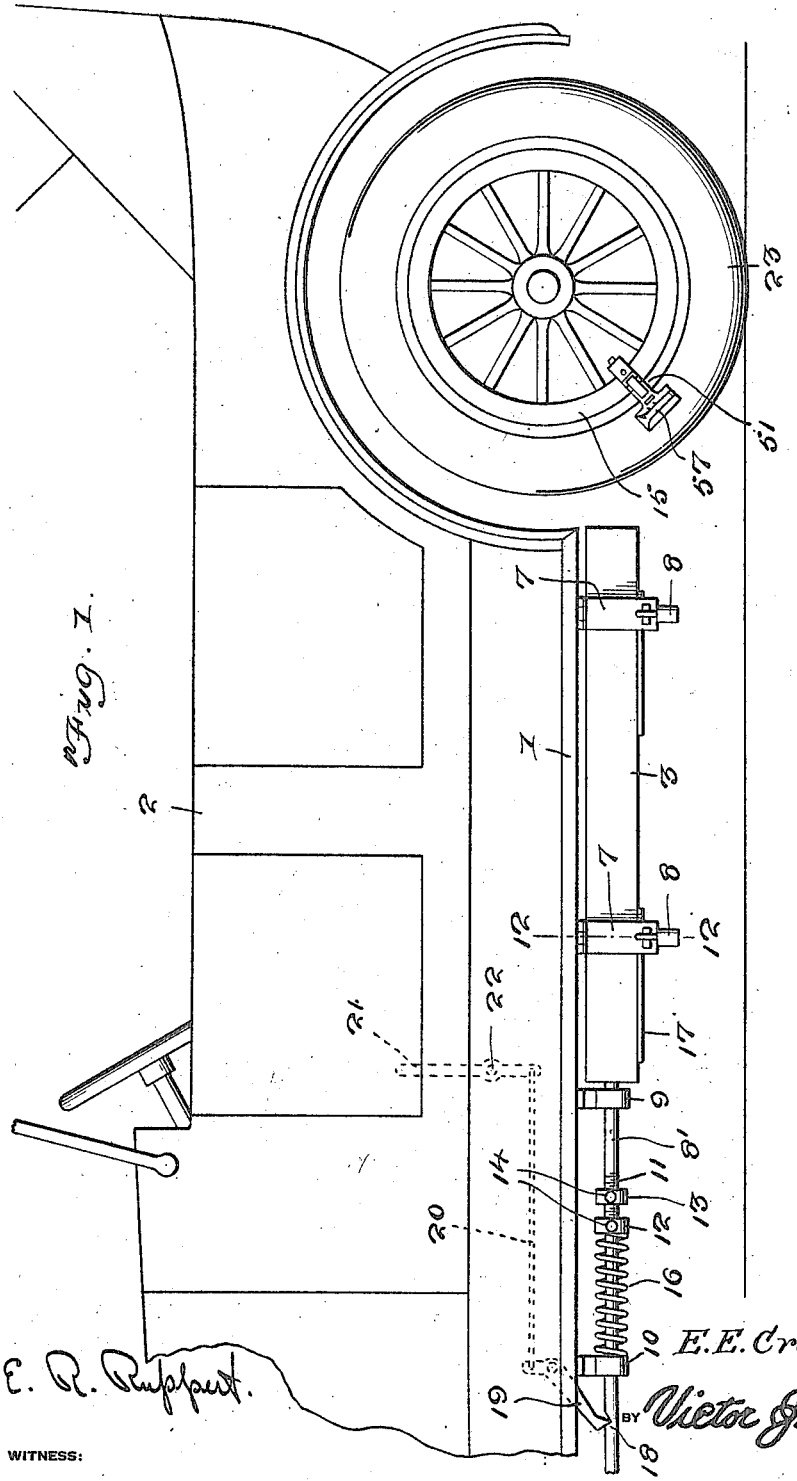

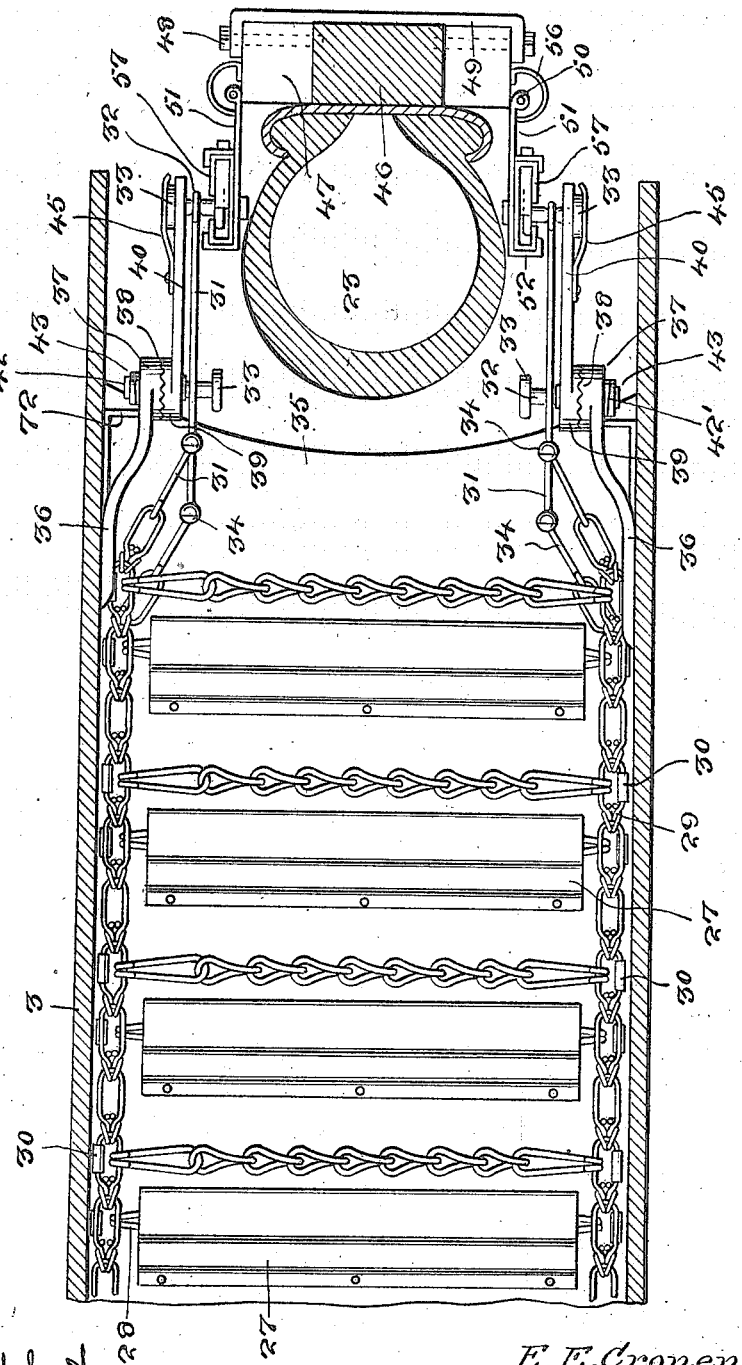

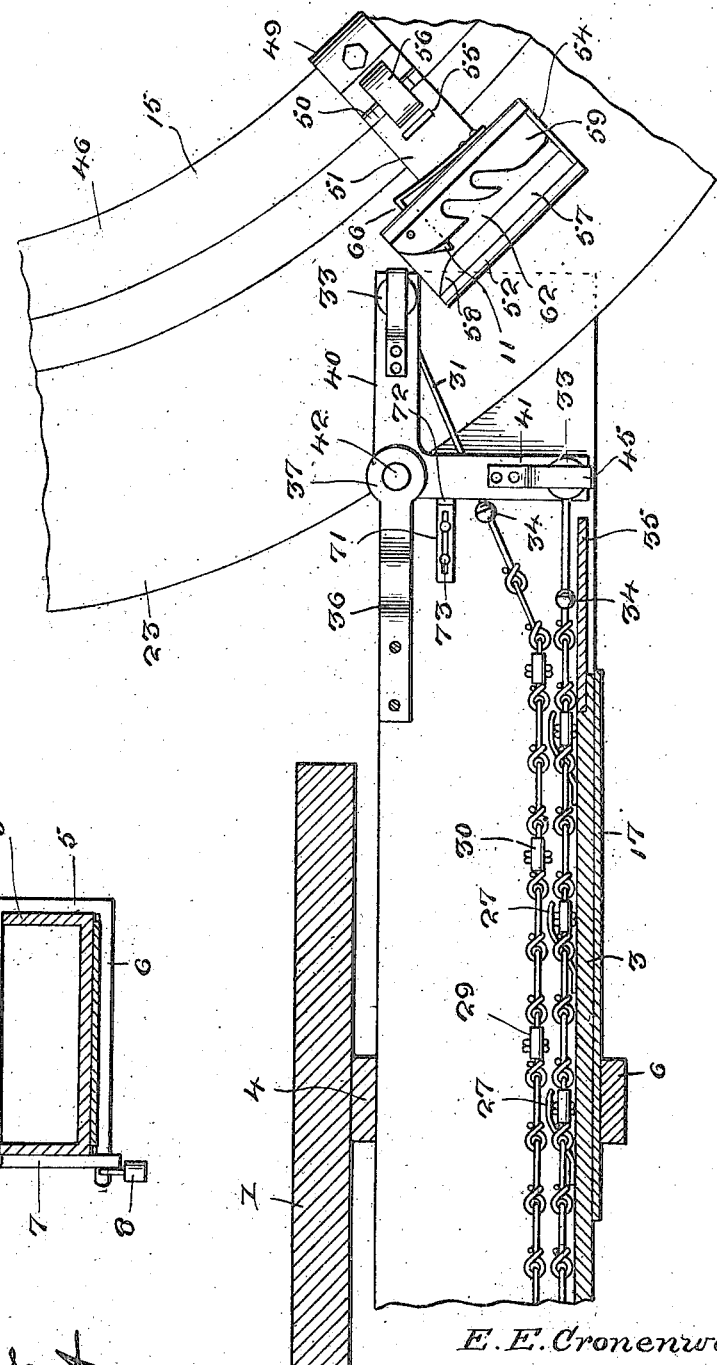

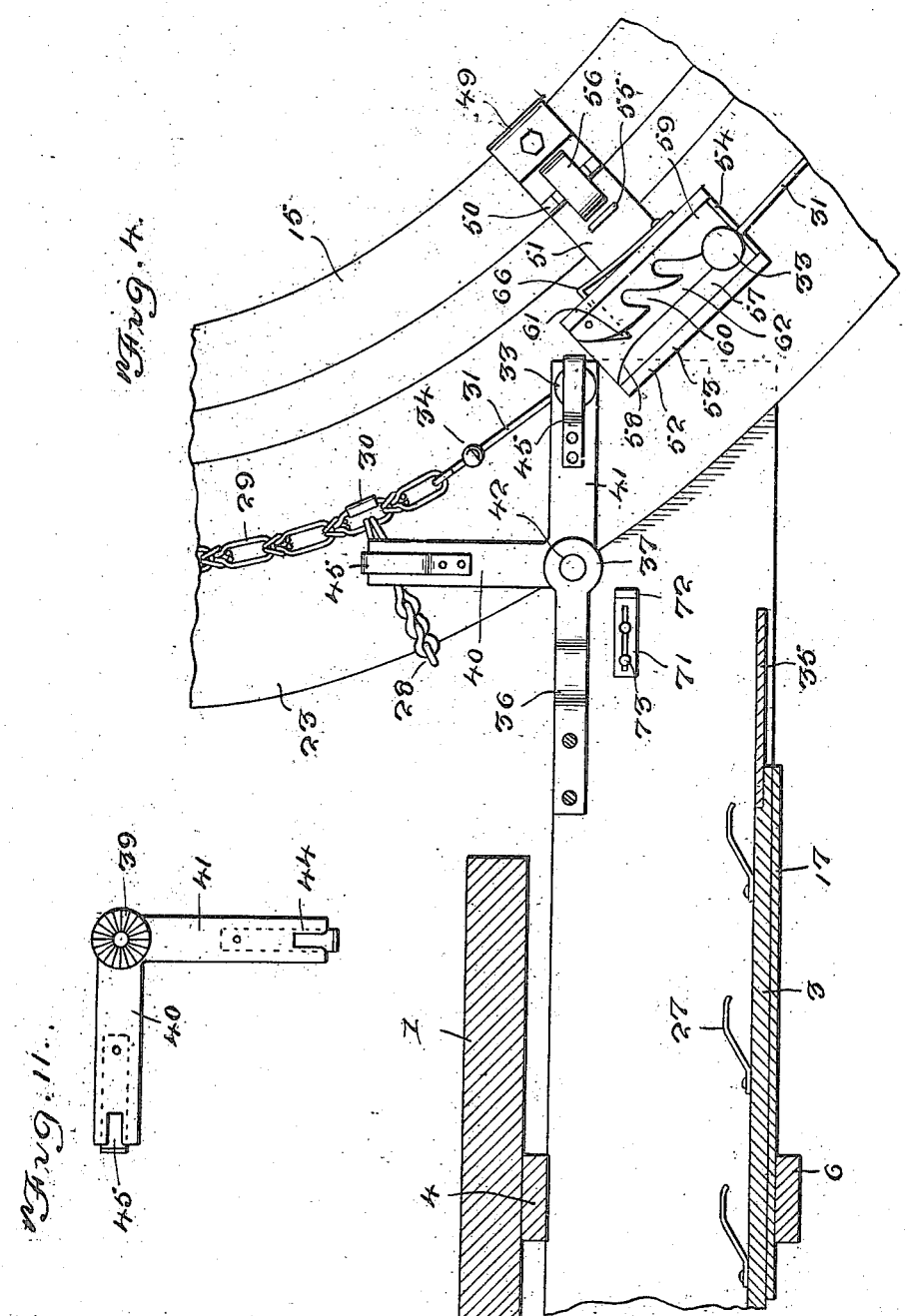

Patented Oct. 14, 1924.

1,511,657

UNITED STATES PATENT OFFICE.

EARL E. CRONENWETH, OF WILKINSBURG, PENNSYLVANIA.

TIRE-CHAIN APPLIER.

Application filed May 21, 1923. Serial No. 640,521.

*To all whom it may concern:*

Be it known that I, EARL E. CRONENWETH, a citizen of the United States, residing at Wilkinsburg, in the county of Allegheny and State of Pennsylvania, have invented new and useful Improvements in Tire-Chain Appliers, of which the following is a specification.

My present invention has reference to a means for automatically arranging around and clamping anti-skid chains on the drive wheels of an automobile, and may be considered in the nature of an improvement upon my U. S. Patent No. 1,487,317, dated March 18, 1924.

With these broadly stated objects, and many others which will appear as the nature of the invention is better understood from the following description when taken in connection with the drawings, the improvement resides in the novel construction, application and novel arrangement of elements hereinafter to be set forth and definitely claimed.

In the drawings which form part of this application:—

Figure 1 is a side elevation of a sufficient portion of an automobile to illustrate the application of the improvement thereon.

Figure 2 is a greatly enlarged detail sectional view through the chain housing showing the parts arranged for the application of an anti-skid chain on the tire of a wheel.

Figure 3 is a side elevation of the construction disclosed in Figure 2, with parts in section.

Figure 4 is a view, similar to Figure 3, but showing the chain arranged around the tire, and the last link thereof about to be engaged by the catch member.

Figure 5 is a sectional view through the tire and its felly taken in a line with the catch members and the swingable housings therefor, the dotted lines showing the position of the housings when in normal inoperative position.

Figure 6 is a face view of the catch housing with the catch therein.

Figure 7 is a sectional view approximately on the line 7—7 of Figure 6.

Figure 8 is a sectional view approximately on the line 8—8 of Figure 7.

Figure 9 is a perspective view of the catch.

Figure 10 is a plan view of the headed link or bar that is connected to the end links of the anti-skid chain.

Figure 11 is a plan view of one of the swingable angle or bell crank levers.

Figure 12 is a transverse sectional view approximately on the line 12—12 of Figure 1, the chain being removed from its housing.

Figure 13 is a fragmentary plan view of a portion of the anti-skid chain to illustrate on the outer arm of the longitudinal link the roller member which is designed to prevent the said links bunching together when arranged loose in the housing.

As in my referred to Patent No. 1,487,317 I arrange beneath the running board 1 of an automobile 2 a housing 3 for an anti-skid chain. The housing is in the nature of a substantially rectangular box that has its forward end closed, its top open and its sides extending a suitable distance beyond the bottom thereof at the rear and open end of the housing. The housing 3 is removably supported on brackets, each of which comprising a substantially U-shaped body portion defining upper straight arms 4 which are clamped or otherwise secured upon the under face of the running board 1, inner right angle arms 5 and lower arms 6 which are parallel to the upper elements 4. Hingedly secured to the upper arm 4 of each of the brackets there is a plate 7 that has its lower end slotted to receive therethrough the end of the arm 6 of the bracket which projects beyond the outer end of the upper arm 4 thereof. The projecting portion of the arm 6 has an aperture therethrough for the hasp of a padlock 8. As disclosed in Figure 1 of the drawings the housing 3 is positioned under the rear portion of the running board, and the said running board provides a protective top therefor.

At its forward closed end the housing 3 has secured thereto a rod 8′ which finds bearings in spaced depending brackets 9 and 10 secured on the under face of the running board 1. Preferably the rod is threaded for a determined length as indicated by the numeral 11, and screwed on this portion of the rod there are nuts 12 and 13 respectively. Each of the nuts is provided with a threaded opening in which is screwed a binding element 14 whereby the nuts may be held positively adjusted on the rod 11. Elements, other than nuts may be arranged on the rod and adjustably fixed thereto in any desired or preferred manner. The nut 13, being disposed nearest the hanger bracket 9 is in the path of contact therewith when the rod is moved longitudinally in a rearward direction and such contact will limit the movement of the housing 3 in the direction of the rear or drive wheels 15 of the automobile 2.

Between the hanger bracket 10 and the element 12 there is arranged on the rod 8' a coiled spring 16 which influences the rod in a rearward direction to move the housing 3 toward the wheel 15. On the bottom of the housing 3 there are wear plates 17 respectively arranged over the lower arms of the brackets to reduce friction in the sliding movement of the housing through the brackets.

The rod 8', outward of the hanger bracket 10 is notched as at 18, and this notch is engaged by a dog 19 which is pivotally secured, preferably to the inner side of the automobile body directly above the running board. The dog 19 has an angle inner end to which is loosely connected a link 20 which in turn is pivotally connected to a lever 21, the said lever being pivotally supported on the automobile body, as at 22. It will be apparent that a pressure in one direction exerted on the lever 21 will swing the same to release the dog 19 from its engagement with the notch 18 so that the spring 16 will bodily influence the housing 3 to move the same toward the wheel 15 and to allow the sides at the open end of the said housing to straddle or receive therebetween the tire 23 of the said wheel 15.

It is, of course, to be understood that a construction as above described, is arranged on each of the running boards of the automobile 2, and also that the dogs 19 are connected together so that the same will be simultaneously operated upon the actuation of the lever 21.

On the bottom of the housing 3 I secure transversely arranged preferably rubber lined arched lipped plates or cleats 27 disposed in proper spaced relation to receive therein the cross links 28 of an anti-skid chain 29. When the chain is arranged in the housing, the same is centrally folded upon itself so that only the lower cross links of the said chain are received in the elements 27, which permits of the upper cross links being disposed between the said elements 27, as disclosed by Figure 2 of the drawings. Preferably the members 27 are of spring metal so that a slight pressure may be exerted thereby against the said cross links, and whereby the anti-skid chain is effectively sustained in the housing regardless of the shocks and jars to which the machine is subjected in its travel.

On all or on certain of the side links of the anti-skid chain I arrange on the outer arms thereof roller members 30. These rollers prevent the bunching of the links when the chain is arranged in or automatically removed from the housing in a manner which will presently be described.

On the end links of the side members of the anti-skid chain I secure rods 31 that have their free ends provided with laterally extending studs 32 that terminate in heads 33. Each rod 31 preferably includes an outer elongated member and an inner short member which is connected to the referred to end links of the anti-skid chain and the elements comprising the rod 31 are swivelly connected together, as indicated on the drawings by the numeral 34.

On the bottom wall of the housing, flush with the upper face thereof and extending beyond the projecting sides of the said housing I secure an apron 35 which is yieldable between the sides of the housing, for a purpose which will presently be apparent.

It is an important object of my present invention to provide means whereby different widths and lengths of chains may be employed so that a construction, as above described, may be applied on the running boards of any make, and consequently any size of tires mounted on the ground wheels of an automobile, and to accomplish this, I removably secure on the sides of the housing 3 directly above the apron 35, but projecting therebeyond, plates 36. These plates have their free ends formed with rounded heads 37 and the inner or confronting faces of the heads are serrated, as at 38. The heads are arranged at an inward angle with respect to the attached body portions of the plates 36, and desired numbers of pairs of such plates are employed in which the heads thereof are spaced at different distances from their bodies so that the space between the confronting head 38 may be widened or shortened in accordance with the plates employed which, it will be seen, as the description further progresses, permits of my improvement being employed in connection with anti-skid chains of different widths.

Arranged for contacting engagement with the serrated face 38 of each head 37 there is a similarly serrated head 39 formed at the juncture of angle arms 40 and 41 respectively. The heads 37 and 39 are provided with aligning openings for the reception of a pivot 42 which has one end projecting through the head 38 and has arranged thereon a small coiled spring 42', a preferably adjustable element 43 contacting the spring to hold the same in similar engagement with the head 37. By this arrangement the angle armed member or bell crank lever is normally sustained from movement on the heads 37 but under pressure either of the arms may be swung on the said head.

Each arm 40 and 41 of each bell crank lever has its outer end notched longitudinally, as at 44 (see Figure 11), and each of the said arms has secured thereto the inner end of a flat spring 45 which straddles the slot or notch and projects therebeyond and may have its outer end lipped inwardly toward the arms 40—41. In these notches the shank 32 on the respective ends of the anti-skid chain are received so that one of the heads 33 will be contacted by the respective springs 45. The normal position of the bell crank lever is as disclosed in Figure 3 of the drawings, the arm 40 thereof being arranged in a horizontal and in an outward position, while the arm 41 is disposed in a downward vertical position.

On the sides of the felly 46 of each of the wheels 15 I secure filler blocks 47. Preferably these blocks are held against the sides of the felly through the medium of bolts 48 that pass through the angle arms of a bracket plate 49.

Pivotally secured, as at 50 to the outer sides of each of the blocks 47, and adjacent to the outer corners of the said blocks there are arms 51. The outer end of each arm 51 has thereon a cross sectionally U-shaped casing or housing 52 for a chain engaging or catch member which will presently be described. The parallel side members of each of the casings 52 have their edges inturned, as at 53, and the base or bottom of the housing, at one end thereof, is formed with an upstanding flange 54 which, however, terminates below the flanges 54. Each of the hinged plates comprising the arms 51 of the casings has a transverse slot 55 therethrough, and secured on the side of each of the blocks 47 there is one end of a C-shaped spring 56. When the casings are swung to operative position, the free ends of the C-shaped springs will contact with the outer faces of the arms 51 holding the said arms and their casings 54 in fixed relation adjacent the sides of the tire 23 of the wheel 15 to receive one head 32 of the rods 31 in the casings, but when the casings are swung to inoperative position, as disclosed by the dotted lines in Figure 5 of the drawings the C-shaped springs are caused to pass through the slots 55 to exert a frictional engagement against one of the walls thereof and to hold the arms of the casing in inoperative position.

The gripping element for the headed members on the ends of the chain is designed to be snugly received in each casing 52, and these elements will hereinafter, for convenience, be referred to as catch members. As disclosed most clearly in Figure 9, each catch member is of a hollow substantially rectangular formation, but the outer face thereof is approximately centrally slotted throughout its length. The walls opposite the slot, at one end of the catch member 57 are rounded in opposite directions toward the sides thereof to provide a flared entrance passage 58 to the slot. One of the walls upon the outer face of the catch member 57, indicated for distinction by the numeral 59, is provided with spaced inwardly rounded notches 60, and outward of the said notches there is pivoted between the face 59 and the rear wall of the hollow catch 57 a dog 61 which, when in normal position, is designed to bridge the longitudinal slot 62 in the said catch member. The pivoted dog 61 has its rear portion susceptible to swinging through an opening 63 in the side wall 64 of the catch 57, but is normally held from such movement through the engagement therewith by the offset end 65 of an arched spring 66, which is secured to the inner side wall of the casings 52 and which passes through a notch or opening 68 in the said wall of the casing. The rear or inner wall of the catch member 57 has a transverse notch 69 therein designed for engagement by the offset end of an arched spring 70 which is secured to the inner face of the casing 52. The offset ends or dogs of the springs 70 hold the catch members 57 in the casings, and it is necessary to move the ends of both the springs 66 and 70 out of the notches or openings in the catch members 57 before the latter can be withdrawn from the casings.

Normally the housings are in the position illustrated in Figure 1 of the drawings, and the casings in the position illustrated by the dotted lines in Figure 5. When a chain is to be applied, the casings manually are swung against the sides of the tire for the wheels 15, as previously described, and the catch members are inserted in the casings. The driver then places his foot against the lever 21, causing the dogs 19 to release the rods 8', and permitting the springs 16 to bodily move the housing 3 longitudinally in the direction of the wheels 15, causing, as previously stated, the sides at the open end of the housings to straddle or to be disposed slightly outward of the sides of the tire 23. The movement of the housings is, as also previously stated, limited by the contacting engagement of the elements 13 and 9. The upper arms 40 of the bell crank levers are now in position to deposit the headed ends of the rods connected to the upper lead of the anti-skid chain into the mouths of the catch members 57. To hold the arms in this position there is arranged on the sides of the housing 3 adjustable contact elements in the nature of slotted bars 71 having offset ends 72 and having adjustable headed elements 73 passing through the slots thereof. The slotted bars 71, after one adjustment require no further attention and such adjustment is only made when the chain is first applied. The ends 72 of the elements 71 are in contacting engagement with the inner edges of the vertically disposed arms 41 of the bell crank levers. The driver shifts the gears of the automobile to cause the wheels 15 to cause the rear wheels to travel in a reverse direction, which brings the heads of the upper rods into the catches. The turning of the wheels 15 will cause the chain to be brought out of the housing and to be properly arranged over the tires 23. The heads of the rods first received in the clamps will contact with the end walls 54 of the casings 52 when the chain is almost and when the chain is fully applied. Such movement will also cause the swinging of the bell crank lever so that the arm 42 thereof will be brought to an upward vertical position and the arm 41 to a horizontal position in an outward direction and in the same plane that was previously occupied by the arm 40. This arranges the head of the rod upon the lower lead of the chain in a position to be received in the mouths 58 of the catch members 57. The turning of the wheels will cause heads to pass over the dogs 61, but the springs 66 will again influence the dogs to obstruct the passage 62 in the catches so that both ends of the chain are effectively sustained in the catches. The heads on the rods last received in the catches may be adjustably arranged in any of the notches 60 so that slackness in the applied chain may be thus taken up. After use, that is when the chain is to be taken off of the tire, the heads of the rods are removed from the catches by an outward pressure upon the springs 66 to permit of the dogs being thrown to inoperative position. The dogs are held in this position by contact of the angle ends 65 of the said springs with the inner and active straight faces of the dogs. The chain is rearranged in its housings, as previously described, the headed rods on the ends of the said chain being brought in engagement in the notches at the ends of the respective bell crank levers. The housing is moved against the pressure of the spring 16 to permit of the dog 19 being again received in the notch 18 on the rods 11, and the catch members are removed from the casings to allow the casings to be swung at an inward angle with respect to the tire 23 and the felly of the rear wheels. It should have been stated that after the headed rod has been delivered from the arms 41 of the bell crank levers a pressure between the turning wheels and the said arms 41 will cause the same to be swung at an upward or inner angle with respect to the housings 3, and also that the housings 3 are moved to position to have their rods 8' engaged by the dogs 19 when the chain is applied to the tires and the vehicle is operated.

The arms 40 of the bell crank levers are normally sustained in horizontal position, as disclosed in Figure 3, when the chain is folded in the housing, and also when the housing is projected for arranging the chain on the tire of the wheel.

When the chain is applied, the arm 40 will have been swung to vertical position and the arm of the bell crank lever to horizontal position, as disclosed in Figure 4 of the drawings. After the application of the chain, the housing is moved to its initial position to bring the same away from the tires of the wheels, and the bell crank lever may be either manually swung to rearrange the arms thereof to the position illustrated in Figure 3 of the drawings or the arm 40 may be brought into contact with the end of the running board 1, and by virtue of such contact the bell crank levers will be swung to the position disclosed in the said Figure 3. When the chains are removed from the tires, and are arranged in the housings in folded condition, the heads on the rods of the end links of the chains are again brought to engage the holding means on the now normally horizontal arms 40 and the normally vertical arm 41 of the bell crank levers.

Having described the invention, I claim:

1. The combination with an automobile and folded skid chains housed thereon forward of the drive wheels thereof, means on the end links of the anti-skid chains, means removably engaging the mentioned means sustaining the latter angularly with respect to each other and for projecting one of said mentioned means beyond the other, means for projecting the housed chains to arrange the last mentioned means on the opposite sides of the wheel tires, and swingable means on the wheels movable against the sides of the tire for engaging one of the chain engaging means to remove the same from the supporting means therefor but revolve the latter and bring the second chain engaging means to a position to be engaged and clamped by the last mentioned means when the wheels are rotated in a reverse direction.

2. The combination with an automobile, of housings supported for longitudinal movement toward and away from the drive wheels thereof and folded anti-skid chains in the housings, means normally holding the housings in last mentioned position, means on the end links of the chains, bell crank levers removably connected with the chain engaging means to project one of the same toward the drive wheels, means for moving the housings longitudinally to cause the bell crank levers to straddle the tires of the wheels, swingable means carried by the wheels designed to be arranged against the tires thereof and to engage the projected chain engaging means to remove the same from the arms of the bell crank levers and wind the chains around the tires, and to further swing the bell crank levers to bring the second arms to arrange the means on the other end links of the chains in position for engagement by the wheel carrying means.

3. The combination with an automobile, of housings mounted in bearings under the running boards thereof, spring means for bodily moving the housings in the direction of the drive wheels of the machine, catch means for holding the housings from influence by said spring means, operating means for said catch means, anti-skid chains centrally folded upon themselves arranged in the respective housings, headed rods connected to the end links of the chains, bell crank levers having their arms removably connected with the heads of said rods and designed when the housings are moved toward the wheels to arrange the said rods on the opposite sides of the wheel tires, and swingable latching means on the wheels and movable over the sides of the tires thereof for successively engaging the heads of the rods and detaching the same from the arms of the bell crank levers when the drive wheels are rotated in a reverse direction.

4. The combination with an automobile, of housings removably secured for longitudinal movement through bearings on the under face of the running boards thereof, spring means influencing the housings toward the drive wheels of the machine, catch means holding the housings from such movement, lever operated means for releasing the catch means, lipped plates on the lower wall of the housings inward of the rear and open ends thereof, folded anti-skid chains in each of the housings and the cross links of the lower leads of the chains being received in the lips of the plates, rods having outer headed ends connected to the end links of the chains, bell crank levers journaled adjacent to the sides of the housings, means for normally holding the bell crank levers from turning, catch means on the arms of the bell crank levers for engaging the heads of the rods and for holding the rods of the upper leads of the chains projected beyond the lower leads thereof, swingable casings on the felly of the drive wheels, removable latches therein, spring means holding the casings against the sides of the tire when the casings are swung thereagainst and for also holding the casings inwardly with respect to the wheel tires when swung to the second position, said casings and catch members when in first mentioned position designed to receive the upper headed members of the anti-skid chains therein to detach the same from the upper arms of the bell crank levers to rotate the latter and to wind the chain around the tire and by virtue of the turning of the bell crank levers to bring the rods on the second arms thereof for engagement in the said casing and catch members.

5. The combination with an automobile having open end brackets secured to the under face of the running boards thereof, swingable arms on the open ends thereof, locking means therefor, housings having open tops and open rear ends and a partially open bottom at their said rear ends slidably received in the brackets, wear plates between the housing and brackets, notched rods secured to and projecting from the front ends of the housings, bearings therefor, adjustable elements thereon, spring means on the rods between one of the bearings and one of said elements for moving the housing in the direction of the drive wheels of the automobile, said second mentioned adjustable element being in the path of contact with one of the bearings for limiting the movement of the housings in said direction, pivoted dogs for engaging the notches of the rods for holding the housings retracted against the tension of the springs, lever means for releasing the dogs, lipped plates arranged transversely in the bottom of the housings, a folded anti-skid chain in each housing having rollers on the longitudinal links thereof and having the transverse links of the lower leads received in the lips of the plates, a rod having an outer headed end secured to each of the end links of the chains, removable plates having outer angle ends secured to the sides of the housing above the chains and further having outer serrated heads, bell crank levers having serrated central portions contacting the heads, pivots passing therethrough, spring means on the pivots to bring the serrated surfaces into engagement, said bell crank levers having notched ends, springs arranged thereover, and the heads of the respective rods designed to be received in said notches and to be contacted by said springs, and means swingably supported on the drive wheels and movable to locked position against the sides of the tire in the path of contact with the upper headed rods, when the housings are influenced toward the tires, for disengaging said rods from the arms of the links and to swing said bell crank levers to permit of the winding of the chain around the tires and the engagement of the second rods by the said means when the wheels are turned in a reverse direction.

6. The combination with an automobile having anti-skid chains normally housed forward of the rear wheels thereof and means for projecting the chains to cause the end links to straddle the tires of the wheels, hinged plates fixedly secured to the felly of the wheels, a C-spring on the fixed section of each plate, the movable section of each plate having a slot to receive the C-spring therethrough when the said section is moved toward the hub of the wheels and designed for contacting engagement with the free ends of the springs when moved against the sides of the tire, a channeled casing on the movable sections of the plates, each of said casings having its edges flanged inwardly and one of its ends flanged upwardly, a substantially rectangular catch slidably received in each casing, spring means holding the catches in the casing, a pivoted dog in each catch, spring means on the casings influencing the dogs to active position, said casings having their outer faces centrally slotted and one of their side walls notched, and headed rods on the ends of the anti-skid chains designed to be received in the catches and to have one of said heads contacting with the end wall of the casing and the other headed member held in the catch upon a complete revolution of the wheels.

In testimony whereof I affix my signature.

EARL E. CRONENWETH.